A. B. HERRICK.
METHOD OF MAKING HOMOGENEOUS MECHANICAL JUNCTURES.
APPLICATION FILED OCT. 26, 1908. RENEWED MAR. 9, 1911.
1,041,281. Patented Oct. 15, 1912.
3 SHEETS—SHEET 1.
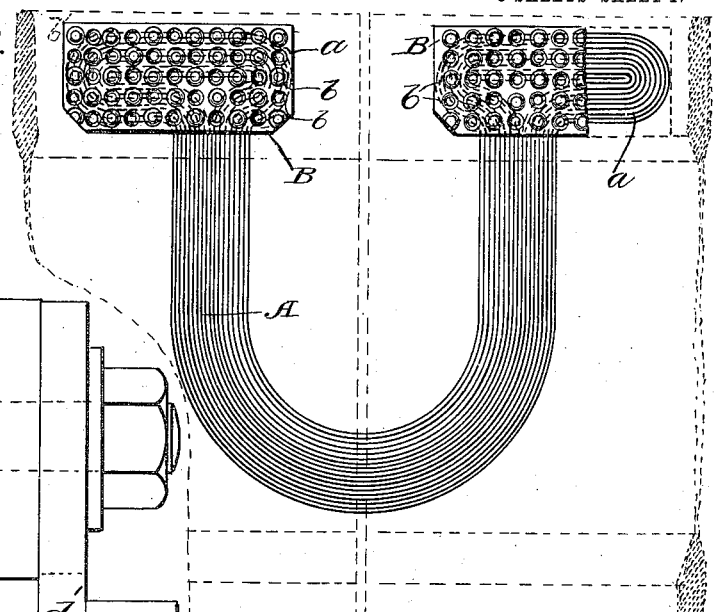
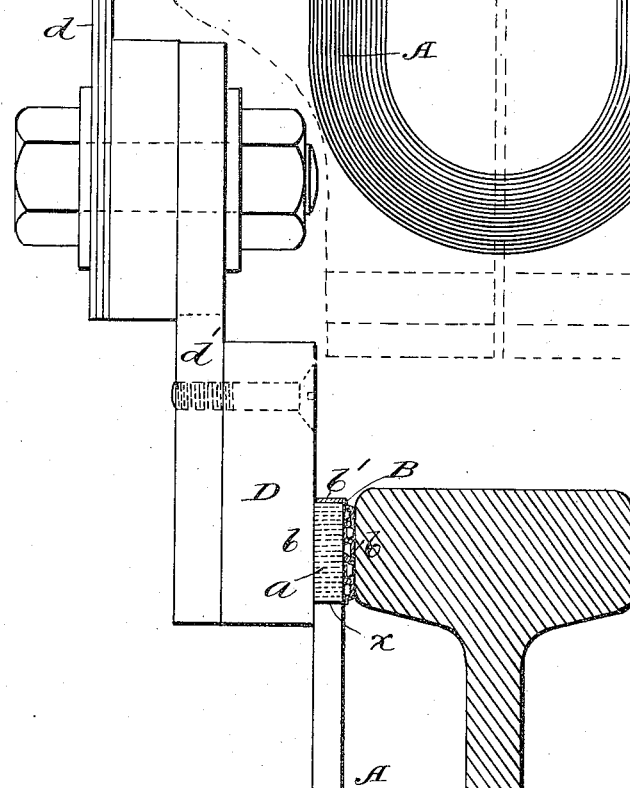
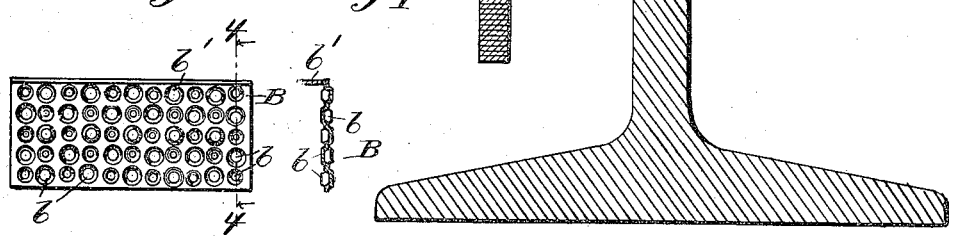

A. B. HERRICK.
METHOD OF MAKING HOMOGENEOUS MECHANICAL JUNCTURES.
APPLICATION FILED OCT. 26, 1908. RENEWED MAR. 9, 1911.
1,041,281.
Patented Oct. 15, 1912.
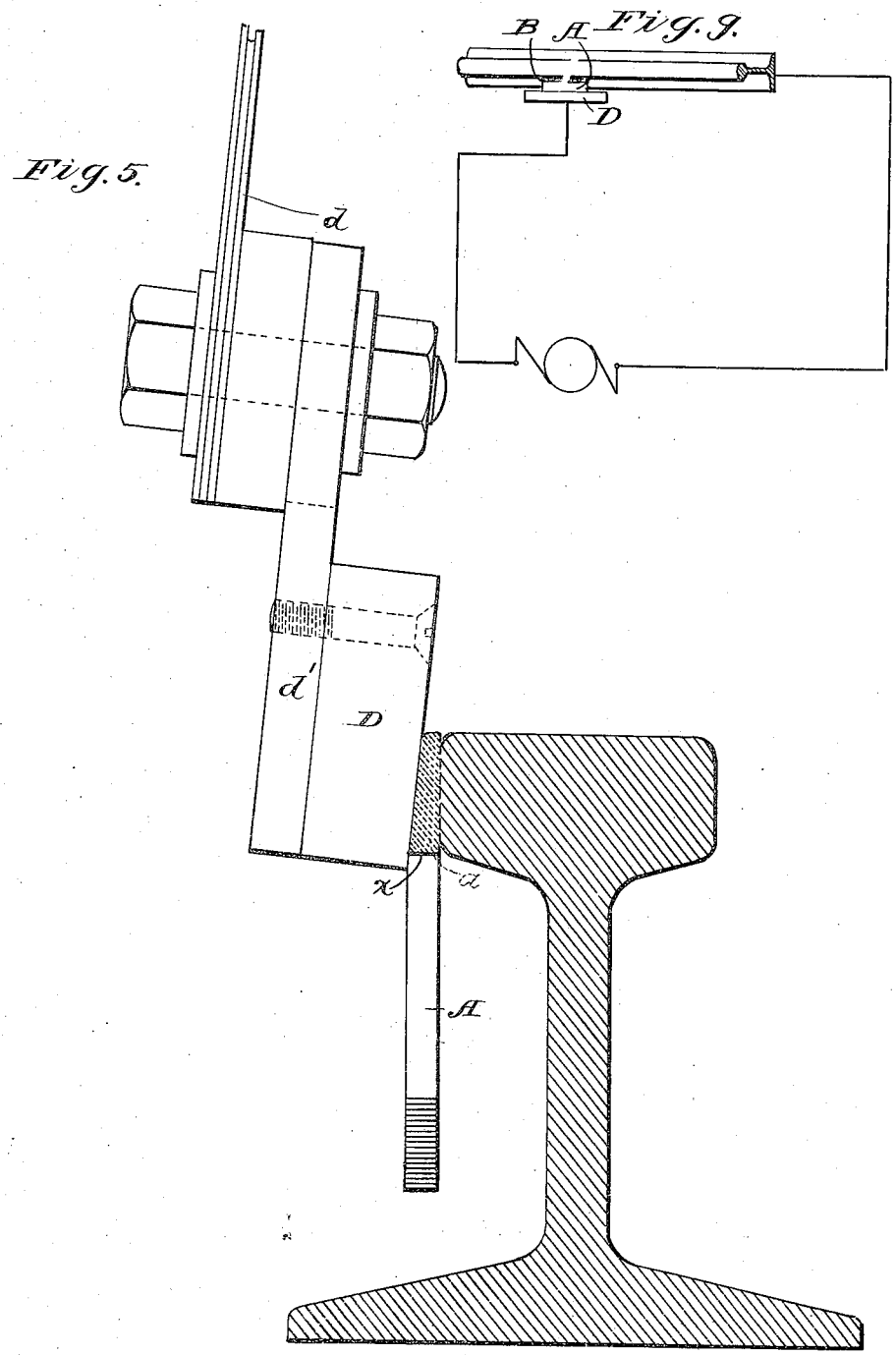

A. B. HERRICK.
METHOD OF MAKING HOMOGENEOUS MECHANICAL JUNCTURES.
APPLICATION FILED OCT. 26, 1908. RENEWED MAR. 9, 1911.
1,041,281. Patented Oct. 15, 1912.
3 SHEETS—SHEET 3.
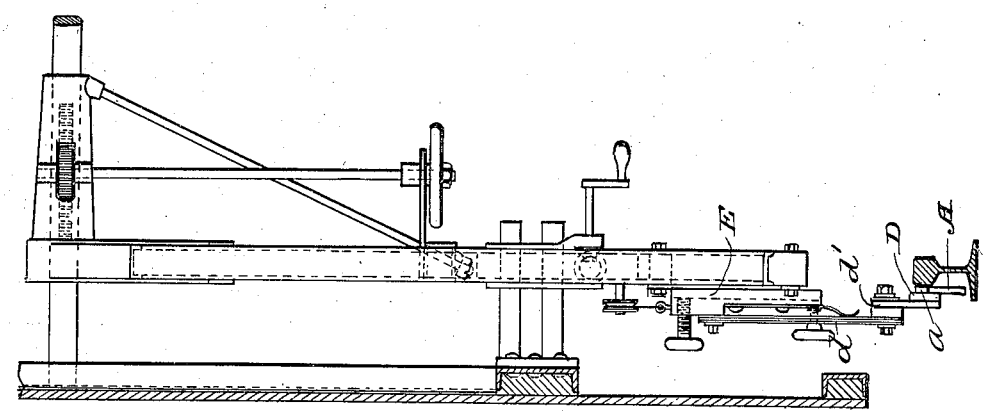
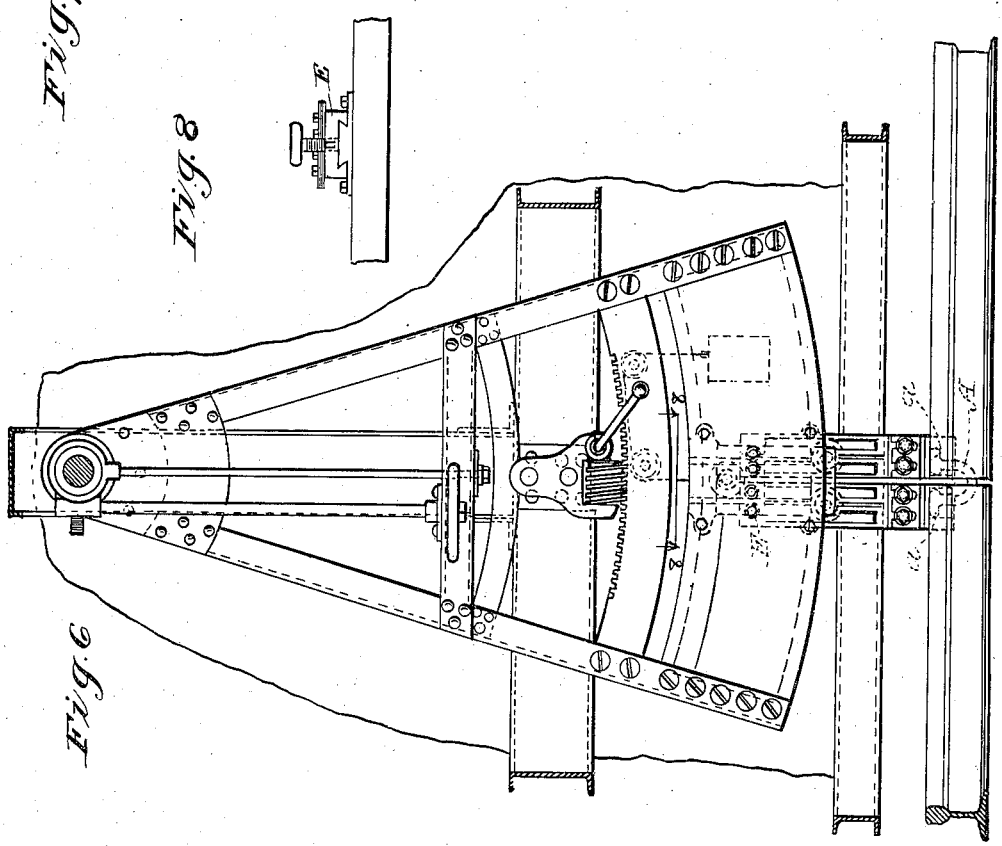

UNITED STATES PATENT OFFICE.

ALBERT B. HERRICK, OF RIDGEWOOD, NEW JERSEY, ASSIGNOR TO THE ELECTRIC RAILWAY IMPROVEMENT COMPANY, OF CLEVELAND, OHIO, A CORPORATION OF OHIO.

METHOD OF MAKING HOMOGENEOUS MECHANICAL JUNCTURES.

1,041,281.     Specification of Letters Patent.     Patented Oct. 15, 1912.

Original application filed November 25, 1904, Serial No. 234,161. Divided and this application filed October 26, 1908, Serial No. 459,503. Renewed March 9, 1911. Serial No. 613,432.

*To all whom it may concern:*

Be it known that I, ALBERT B. HERRICK, a citizen of the United States, and a resident of Ridgewood, county of Bergen, and State of New Jersey, have invented a new and useful Improvement in Methods of Making Homogeneous Mechanical Junctures, of which the following is a specification, the principle of the invention being herein explained and the best mode in which I have contemplated applying that principle, so as to distinguish it from other inventions.

My invention relates to a method of making homogeneous mechanical junctures between two metallic bodies, and particularly to the uniting of copper bonds and steel rails so as to bring the electrical conductivity of the abutting rails up to the required degree.

The object of the invention is to provide such a "bonding" process that may be carried on in a rapid, economical and efficient manner.

To the accomplishment of this and related ends said invention consists of the steps hereinafter fully described and particularly set forth in the claims, such claims having been divided out of my co-pending application filed November 25, 1904, Serial No. 234,161.

The present process, as will be later made clear, is to be distinguished from processes of soldering bonds to rails whether by electrical or other means; for by a homogeneous mechanical juncture I mean to designate a union between the metals composing the bonds and rail more intimate than that secured at the low temperature at which solder will melt. The soldered bond has never proven a success practically for the reason that a soldered joint is first of all mechanically weak and a bond thus attached can be very easily stripped off the rail; in fact, in actual use, they very frequently shake off merely owing to the vibration occasioned by passing cars. Since such bonds may be put on at a low temperature, as stated, a blow torch is ordinarily employed to supply the heat. As a result of the low temperature, however, there is no change made in the character of the contacting faces of the bond and rail, but merely a sufficient heating of the same is had to permit the solder to "tack", as it were, the bond thereto. Not only is this type of joint mechanically inefficient, but also the electrical conductivity of such joint is deficient, since it is almost impossible to get a thorough contact between the contiguous faces of bond and rail, the solder melting out and oxidizing, even at the low temperature secured by a torch, so as to leave the contact broken in spots.

A welded union obviously presents many superior characteristics to a soldered joint of the kind just discussed. A very serious difficulty arises, however, when it is attempted to effect this kind of a joint between a bond and rail, for not only are the masses of the two bodies widely disparate, but the materials of which they are composed likewise differ very much in their heat conducting character and in their temperatures of fusion. Owing to the higher temperature needed to weld materials of the kind here involved, as well as the requirement that the heat be localized—in other words, that its application be limited to a restricted portion of the rail—, experimenters in bonding by welding or brazing have for the most part employed the electric current as the heating agent.

I am aware of the several processes of soldering or welding electrically, generally known as the Thomson processes, but these, as is well understood, have never been successfully applied to the uniting of bodies, or masses, of unlike characteristics as to fusibility without more or less modification, since such method consists in simultaneously raising the temperature of the two bodies to be joined to the melting point either by the passage of an electric current directly therethrough, the desired heat being produced by the resistance encountered at the joint, or else by passing such a current through electrodes having a high electrical resistance pressed against the two bodies to be joined at points adjacent to the desired juncture. Where, however, bodies of the character here under consideration are to be handled, the method just described will obviously not secure the result sought, namely, the heating of the two bodies equally. Various modifications of the general method of Thomson have hence from time to time been brought forth in an effort to provide a process for uniting bodies of this character, such methods being in general directed to the problem here in hand, that of bonding rails, since this has become one of prime importance owing to the rapid increase in the mileage of electric railways. Thus it has been sought to obviate the difficulty encountered in the application of the Thomson process to the welding of bodies of unequal mass, or having different characteristics as to fusibility, by reducing the cross sectional area of contact in the case of one body, whereby the raising in temperatures of the two bodies may be properly controlled to bring them to the necessary welding temperature simultaneously. The resultant welding, however, is confined to the points of contact, in other words, the entire contacting superficial areas are not united. This method, while useful in certain connections, is obviously impractical for the bonding of rails, inasmuch as a thorough contact of the entire bond terminal is essential to the successful operation of the bond in conducting the current from one rail to the other.

Accordingly, while the method just described may in certain instances produce a satisfactory mechanical joint, it does not produce a good electrical joint. In another process, it has been sought to overcome the difficulty noted by preliminarily and independently heating the section of the rail to which the bond terminal is to be applied. This process, although in a certain and limited sense effective, has proven objectionable on account of the double operation involved and consequent loss of time, the joint, owing to the presence of the large mass of highly heated steel, cooling relatively slowly and thus not only entailing delay but also causing deterioration of the bond at the point of juncture. In still another method a welding or brazing of the bond to the rail has been sought to be accomplished by concentrating heat from two external sources upon the metals at opposite sides of the joint as in the Thomson process, but varying the respective heat intensities as the nature of the metals might require. The difficulties in practically carrying out this method of bonding will likewise be apparent, for aside from the more or less delicate character of the adjustment of the heat intensity involved, this method like the one preceding involves the heating of a relatively large section of the rail with the same consequences above named. Neither of the two methods last described have ever, so far as is known, been carried out on anything like a commercial scale. By my present method or process I am enabled to obtain, to a more perfect degree than by the two above named processes, a welded joint between the copper of the bond and the steel of the rail, while at the same time the rapidity by which the operation may be carried on is much increased.

The annexed drawings and the following description set forth in detail certain steps embodying the principle of my invention, the disclosed method, however, being but one of various ways in which the principle of my invention may be employed.

In said annexed drawings:—Figure 1 represents a vertical transverse cross-section of a standard steel rail and a bond applied thereto, and in position for the bonding process. In this figure, I have also illustrated a portion of the means for holding the bond in place and for supplying the necessary electrically generated heat for carrying out the process. Fig. 2 represents a front elevation of one of the bonds used in this process, a portion of the cementing or fluxing material, the introduction of which between the bond and rail characterizes the present specific form of my process, being shown broken away on one end of such bond; in this figure, I have also indicated in dotted lines the ends of two contiguous rails so as to show the relative positions of said rails and bond. Fig. 3 represents an elevational view of the strip of fluxing material such as may be applied to the bond and the rail, as indicated in Fig. 2. Fig. 4 represents a vertical transverse section of such strip. Fig. 5 represents a view similar to that of Fig. 1 but showing the bond in its condition of firm union with the rail, the lower end of the device for clamping the head of the bond being also shown in the position which it occupies at the end of the process. Fig. 6 represents an elevational view of the mechanism for moving a clamping and heating device that may be used in my improved process, toward and from the rail and also vertically. Fig. 7 represents an end elevation of such mechanism; Fig. 8 is a transverse section of a portion of such mechanism and Fig. 9 shows in diagrammatic fashion an optional arrangement of the electric circuit as employed in carrying on my improved process.

My improved process is preferably carried out in the hereinafter described manner: The bond A is preferably formed of laminations of copper ribbon of suitable dimensions, one form being that shown in Fig. 2, wherein the bond is given a general U-shaped form with widened terminals $a$, $a$. The one surface of such terminal is covered with a strip B of sheet brass or bronze, or similar material, which possesses a comparatively high melting point, such melting point being, however, lower than that of copper and which will, when melted, serve to more readily and evenly conduct the heat from the copper to the steel, and to protect the adjacent faces of the bond and rail during the heating process. The strip of brass is preferably formed as shown, with a multiplicity of indentations b formed alternately upon opposite sides of the strip, as clearly appears in Figs. 3 and 4. Through the medium of these indentations it will be seen that the surface of the strip in contact with the copper bond is reduced so as to be considerably less than the whole surface of said strip. The part that this detail plays in the general process will be more fully explained later. This strip of brass or bronze is secured to the bond terminals mechanically, in any suitable manner as, for example, by turning under the lower corners and pressing same upon the terminals and providing the upper portion of the strip with a flange b' bearing upon the upper surface of the bond terminal. A flux, which may be of any suitable material, may also be advantageously used between the bond and rail to dissolve or remove impurities from their surfaces and thus facilitate their union. The lateral surfaces of the abutting rails to which it is intended to apply the said bond are first cleansed to remove therefrom scale and rust, which might detract from the formation of a perfect union. This is preferably done by grinding or chiseling which may be done by any suitable mechanism. The terminals of the bond are then applied to such surfaces and in a manner such as to interpose the brass or bronze strip between the bond proper and the rails, as shown in Fig. 2. It will be noted that in this position the area of the surface of the strip in contact with the rail is considerably less than the entire opposing surfaces of the said bond and rail. The bond being so placed by hand or by means of a suitable holder, a heating device D is next caused to press upon the outer surface of the bond terminals, as shown, so as to hold the bond firmly in the described position.

The heating device here chosen for illustrative purposes is shown in part only and consists essentially of a block of carbon D so mounted as to be movable in a vertical direction together with its holder, whereby the required position thereof may be effected opposite that portion of the lateral surface of the rail to which it is desired to attach the bond, such block being furthermore movable in a transverse direction with respect to the rail surface thus referred to. So much of the mounting or holder of the block as is herein shown consists simply of an electrical conductor d, with whose lower end is connected the holder proper d'. It is to the inner surface of the latter that carbon block D is secured, the latter being in electrical connection with the conductor d through the medium of the said holder d'. Such conductor d is flexibly connected with a support E that is movable upwardly and downwardly and toward and from the rail to permit of the adjustments of the carbon block just described. By the means just described such carbon may be caused to bear firmly against the bond in position and hold the same tightly to the rail. A suitable source of electricity is provided for passing a current through a circuit including carbon D, whereby the latter may be raised to any desired degree of temperature owing to the resistance interposed by the material of which it is made to the passage of such current therethrough, the preferred arrangement of circuit being that illustrated in Fig. 9.

The bond having been placed, as previously described in contact with the adjacent ends of the two rails to be joined, see Fig. 2, wherein such rail ends are shown in dotted outline, the carbon block is brought against one of the terminals of the bond and preferably, for a reason to be explained presently, in such manner as to cause the block to assume a slightly inclined position as is shown in Fig. 5. Current is now turned on and passed through the carbon block, bond terminal, interposed strip of brass or bronze and the rail.

Owing to the character of the interposed strip, fully described above, sufficient resistance is developed to effect the fusion of such strip upon the initial application of current. The continued passage of the current through the carbon block causes the latter thereupon to be highly heated and such heat is transmitted by conduction through the bond and now molten strip, which in its fused condition forms a superior heat and electricity conducting joint between the bond and rail, whereupon the contacting face of the rail becomes heated and softened to a sufficient extent to form a homogeneous union or weld with the copper of the bond terminal. During such heating and softening of the copper of the bond terminal and contiguous rail face, the flexible conductor d permits of the required pressure, and hence contact, between the carbon and terminal. At the termination of the process the carbon still occupies the inclined position shown in Fig. 5, whereby it is seen that the greater pressure is applied at the upper ends of the bond terminal. The normal-cross-section of the lower portion of the bond terminal indicated by x in the afore-mentioned Fig. 5 is thus maintained. Were it reduced, as would be the case if the carbon was applied squarely, the electrical conductivity of the bond would be reduced below its designed amount.

The above described process may be carried out simultaneously upon the two terminals if desired, in which event a duplicate of the device D just described is provided, preferably upon the same support, as illustrated in Fig. 6. While the above described process embodies the preferred way of carrying out my improved method, and effects the required result with facility, I have found that it is not essential, in so far as concerns the spirit of the invention, to use either a flux or a strip of brass or bronze, but that the copper may be united directly to the steel rail by the steps hereinbefore described, providing a current such as will effect the necessary temperature be utilized. Results in practice, however, have shown that the temperature application has to be prolonged with attendant possibility of injury to the structure of the rail head, which it is one of the purposes of the present process to avoid as has already been pointed out. The process may also be carried out without passing the heating electric current through the bond, in other words without introducing the bond and rail into the electric circuit, but by maintaining the contact of the carbon block with the bond terminal and passing the current through the carbon block only, the latter being directly connected in the circuit, where the rail is not the return conductor.

In other words, regarding the process in its general aspect, such block constitutes simply an external heat source whereby heat may be applied to or concentrated upon the bond. The latter then conducts the heat thus received to the portion of the rail that it is desired immediately to affect and being of a character such as to permit this conduction at a very rapid rate, more rapidly, in other words, than the heat can be dissipated through the rail, I find that the contacting superficies of the two bodies are raised practically simultaneously to the required welding temperature. This, it will be obvious, is accomplished without the loss of time and waste of energy that would be incidental to raising to such temperature the entire section of rail adjacent to the portion to be bonded. By reason of the high welding temperature of copper and steel and the conduction of heat by the rail, the current may be turned off practically simultaneously with the pressure and a satisfactory joint produced. This feature, it will hence be seen, facilitates the operation by dispensing with the prolonged application of the pressure after the current is turned off, such prolonged pressure being a necessary feature not merely of the Thomson process, but so far as I am aware, of all of the later modifications of this process to which reference has been made above.

The use of the strip of brass or bronze, as has been pointed out, has a further beneficial effect in that, owing to its fusion at an early stage of the operation, a body is introduced between the bond and rail, which will be a good conductor of heat as well as of electricity; while at the same time, owing to the liquid state which it assumes, such body is admirably adapted to cover the juxtaposed faces of the bond and rail, so as to protect them from oxidation during the subsequent stage of the operation, while the bond and rail face are being brought to a welding temperature. While it is contemplated that the preliminary fusion of the strip may be best accomplished by constituting of it an element of resistance, as by the means hereinbefore described, so that the initial effect of the electric current (before sufficient time has necessarily elapsed to raise the carbon block to incandescence) will be to melt the strip, obviously, however, the relatively lower fusing point of the material of the strip will insure such preliminary melting, were the rising temperature of the electrode alone depended upon as the source of heat.

In conclusion it should be noted that in general I herein refer to the juxtaposed or contiguous faces of the bond and rail at the desired point of union, as the contacting faces. This is simply for uniformity in expression, and does not of necessity imply that the faces in question are literally in contact, especially not at the beginning of the operation, nor where a sheet of brass or bronze is interposed, as is the case in the specific mode of carrying out the process herein alone claimed.

Other modes of applying the principle of my invention may be employed instead of the one explained, change being made as regards the process herein disclosed, provided the step or steps stated by any one of the following claims or the equivalents of such stated step or steps be employed.

I therefore particularly point out and distinctly claim as my invention:—

1. The method of homogeneously uniting metal bodies having unlike heat conductivities, which consists in interposing between said bodies at the desired point of union a relatively more fusible material; holding said bodies in contact with such material; and thereupon applying heat from a single external source to said bodies, the heat applied to the body of greater conductivity passing by conduction through such body and interposed material to the contacting face of the second body, whereby said first body and such contacting face of the second body are brought to a welding temperature practically simultaneously, substantially as described.

2. The method of homogeneously uniting metal bodies having unlike heat conductivities, which consists in interposing between said bodies at the desired point of union, or joint, a relatively more fusible material; holding said bodies in contact with such material; and thereupon applying heat to that side of the joint only on which the body of greater conductivity is located, whereby said body of greater conductivity and the contacting face of the other body are brought to a welding temperature practically simultaneously, substantially as described.

3. The method of homogeneously uniting metal bodies having unlike characteristics as to fusibility, the more readily fusible body having also the greater heat conductivity, which consists in interposing between said bodies at the desired point of union, or joint, a relatively more fusible material; holding said bodies in contact with such material; and thereupon applying heat to that side of the joint only on which the first or more readily fusible body is located, whereby said more readily fusible body and the contacting face of the other body are brought to a welding temperature practically simultaneously, substantially as described.

4. The method of homogeneously uniting metal bodies of unlike masses and different temperatures of fusion, the smaller mass having both the lower temperature and the greater heat conductivity; which consists in interposing between said bodies at the desired point of union, or joint, a relatively more fusible material; and thereupon applying heat to that side of the joint only on which the first or smaller body is located, whereby said smaller body and the contacting face of the larger body are brought to a welding temperature practically simultaneously, substantially as described.

5. The method of homogeneously uniting a bond to a rail, which consists in interposing between the bond and rail at the desired point of union, or joint, a relatively more fusible material; holding said bond and rail in contact with such material; and heating such joint from the bond side only, such heating being effected by pressing an electrode of high resistance against the outer face of said bond and then passing an electric current through said electrode, such current being adapted to produce a high temperature in said electrode, thereby effectively heating the contacting face of said rail from the same electrode by conduction through said bond and interposed material, whereby said bond and such contacting face of the rail are brought to a welding temperature practically simultaneously, substantially as described.

6. The method of homogeneously uniting metal bodies having unlike characteristics as to fusibility, the first, or more readily fusible, body having also the greater heat conductivity; which consists in interposing between said bodies at the desired point of union a material more readily fusible than either of said bodies; holding said bodies in contact with said material; fusing such material, and bringing said first body and the contacting face of the second body to a welding temperature practically simultaneously, by applying heat from an external source to said first body only, thereby effectively heating such contacting face of the second body by conduction through such first body, substantially as described.

7. The method of homogeneously uniting metal bodies having unlike masses and different temperatures of fusion, the first, or smaller, body having both the lower temperature of fusion and the greater heat conductivity, which consists in interposing between said bodies at the desired point of union a material having a temperature of fusion lower than that of said first body; holding said bodies in contact with such material; fusing such material, and bringing said first body and the contacting face of the second body to a welding temperature practically simultaneously, by pressing an electrode of high resistance against said first body only and passing a heating electric current through said electrode, whereby the latter is raised to a high temperature, thereby effectively heating such contacting face of the second body by conduction through such first body, substantially as described.

8. The method of homogeneously uniting metal bodies having unlike characteristics as to fusibility, which consists in interposing between said bodies at the desired point of union a relatively more fusible material; holding said bodies in contact with such material; pressing an electrode of high resistance against the outer face of the first, or more readily fusible, body only; then passing an electric current through said electrode, bodies, and interposed material, the resistance of the joint between said bodies being such as to effect the fusion of said material upon the initial application of current, and such current being adapted to develop a high temperature in said electrode; and securing effective heating of the contacting face of the second body by conduction from the same electrode through said first body and the joint thus made to such contacting face, whereby said first body and such contacting face of the second body are brought to a welding temperature practically simultaneously, substantially as described.

9. The method of homogeneously uniting metal bodies of unlike masses and different temperatures of fusion, the smaller mass having also the lower temperature of fusion, which consists in interposing between said bodies at the desired point of union a material having a temperature of fusion lower than that of said smaller body; holding said bodies in contact with such material, pressing an electrode of high resistance against the outer face of said smaller body only; then passing an electric current through said electrode, bodies and interposed material, the resistance of the joint between said bodies being made such as to effect the fusion of said material upon the initial application of current, and such current being adapted subsequently to develop a high temperature in said electrode; and securing effective heating of the contacting face of said larger body by conduction from the same electrode through said smaller body and the joint thus made to such contacting face of said larger body, whereby said smaller body and such contacting face of the larger body are brought to a welding temperature practically simultaneously, substantially as described.

10. The method of homogeneously uniting metal bodies of unlike masses and different temperatures of fusion, the smaller mass having both the lower temperature of fusion and the greater heat conductivity, which consists in interposing between said bodies at the desired point of union a material having a temperature of fusion lower than that of said smaller body; holding said bodies in contact with such material; pressing an electrode of high resistance against the outer face of said smaller body only; then passing a heating electric current through said electrode, bodies, and interposed material, said material being formed to produce a resistance at the joint between said bodies adapted to effect the fusion of said material upon the initial application of current, and such current being adapted subsequently to develop a high temperature in said electrode; and securing effective heating of the contacting face of the larger body by conduction from the same electrode through said smaller body and the joint thus made to such contacting face, whereby said smaller body and such contacting face of the larger body are brought to a welding temperature practically simultaneously, substantially as described.

11. The method of homogeneously uniting a bond to a steel rail, which consists in interposing between said bond and rail at the desired point of union, a braze having a temperature of fusion lower than that of said bond; holding said bond and braze against the rail at such point; pressing an electrode having a high resistance against the outer face of said bond only; and then passing a heating electric current through said electrode, bond, braze and rail, said braze being formed to produce a resistance at the joint between said bond and rail adapted to effect the fusion of said braze upon the initial application of current, and such current being adapted subsequently to develop a high temperature in said electrode; and securing the effective heating of the contacting face of the rail by conduction from the same electrode through said bond and the joint thus made to such face, whereby said bond and such contacting face of the rail are brought to a welding temperature practically simultaneously, substantially as described.

Signed by me this 15th day of October, 1908.

ALBERT B. HERRICK.

Attested by—
W. H. Wheny,
J. D. Fay.